May 11, 1965　　　C. M. RIVELY ET AL　　　3,183,395
MODULE ASSEMBLY FOR PROJECTION LAMPS
Filed May 12, 1960　　　　　　　　　　　　　　4 Sheets-Sheet 1
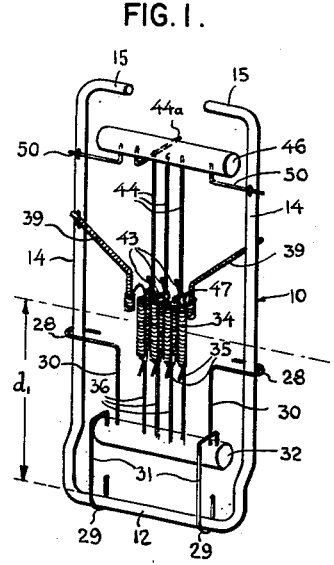
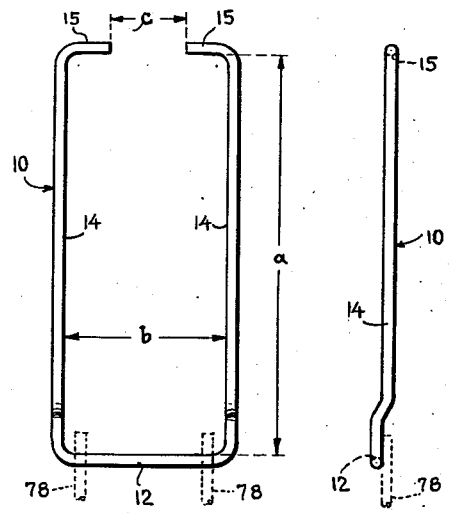
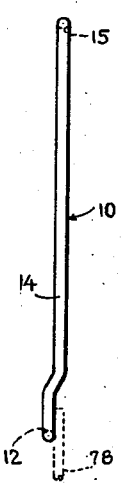
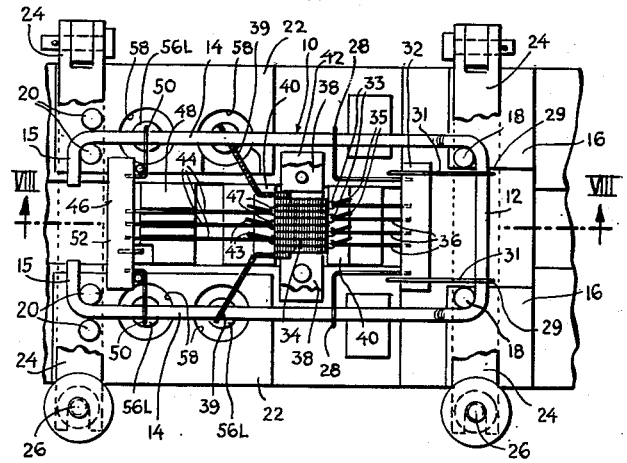
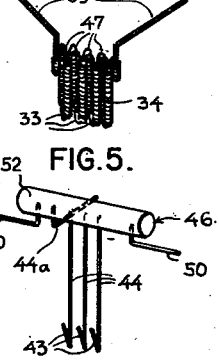
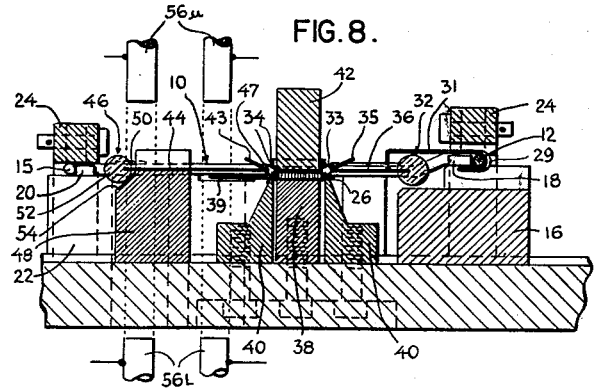
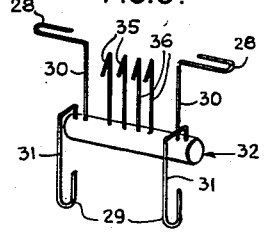
INVENTORS
CLAIR M. RIVELY and
JACOB F. MICHAEL.
BY
ATTORNEY.

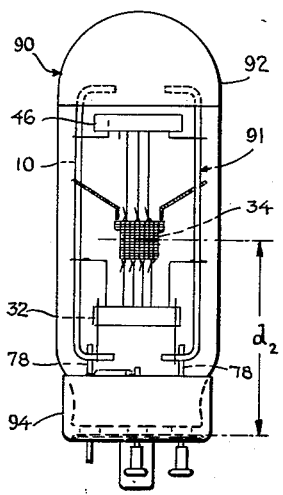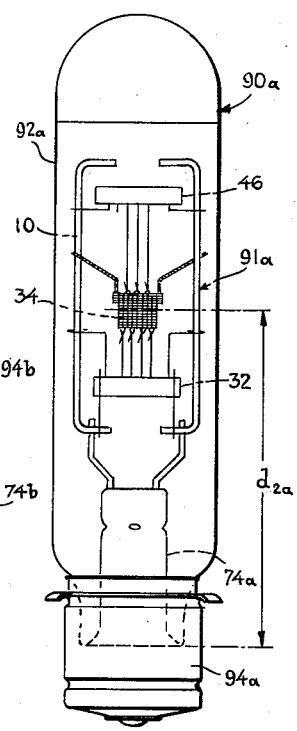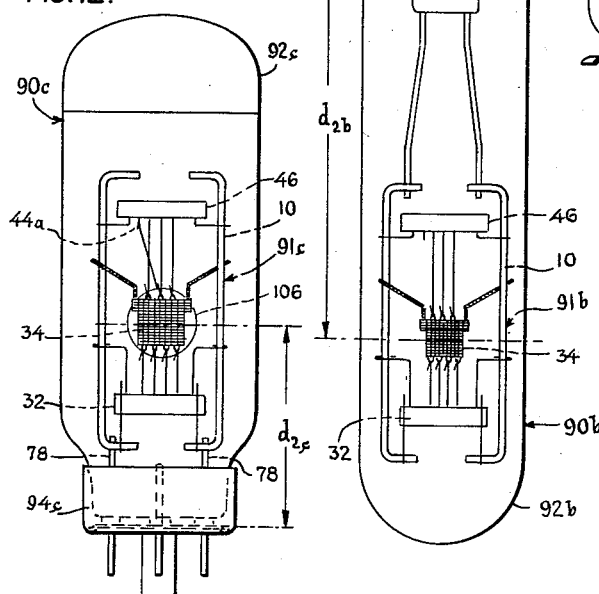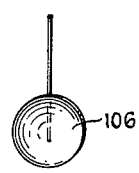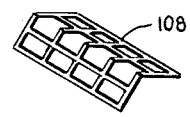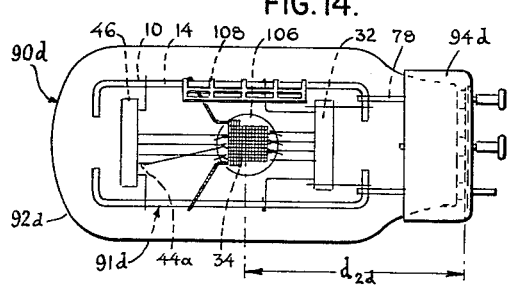

May 11, 1965    C. M. RIVELY ET AL    3,183,395
MODULE ASSEMBLY FOR PROJECTION LAMPS
Filed May 12, 1960    4 Sheets-Sheet 3

INVENTORS.
CLAIR M. RIVELY and
JACOB F. MICHAEL.
BY
ATTORNEY.

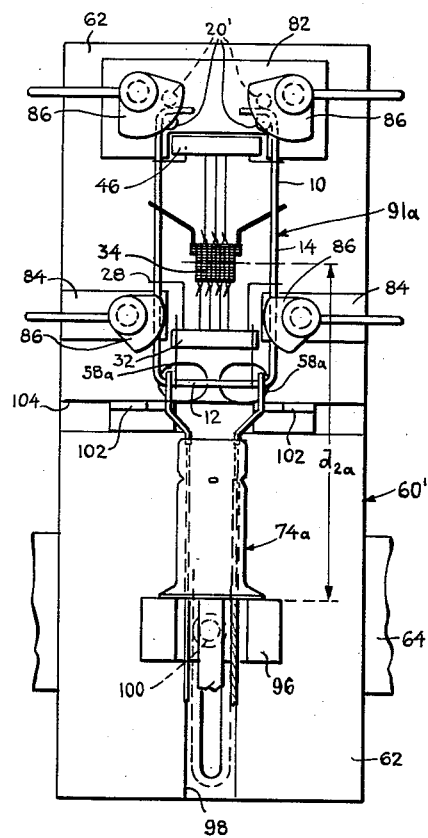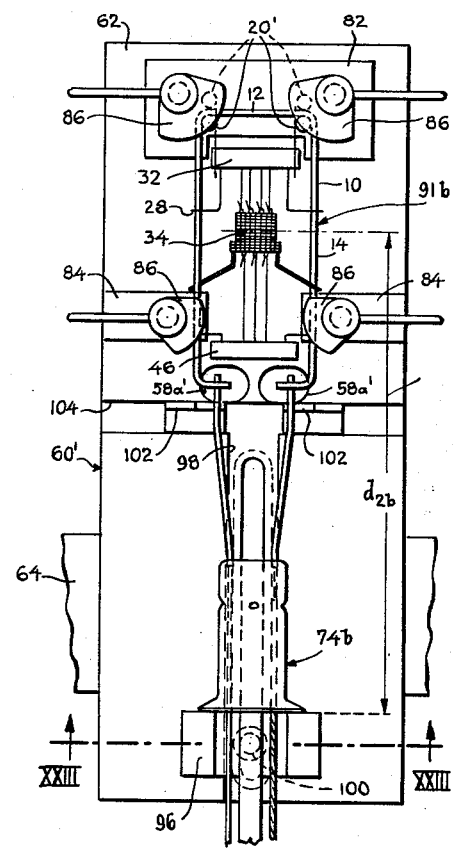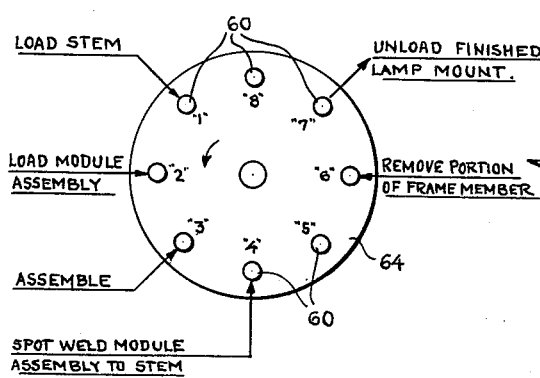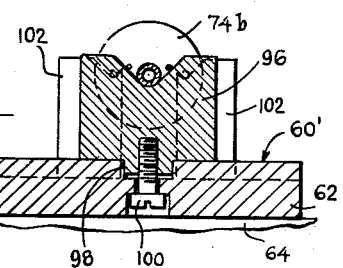

United States Patent Office 3,183,395
Patented May 11, 1965

3,183,395
MODULE ASSEMBLY FOR PROJECTION LAMPS
Clair M. Rively, Rockaway, and Jacob F. Michael, Englewood, N.J., assignors to Westinghouse Electric Corporation, East Pittsburgh, Pa., a corporation of Pennsylvania
Filed May 12, 1960, Ser. No. 28,576
2 Claims. (Cl. 313—271)

The present invention relates to the manufacture of incandescent lamps for projection service and, more particularly, to a module assembly and the method of making and of mounting such module assembly in projection lamps.

Heretofore, projection lamps have had a filament-mount construction similar to that shown in U.S. Patent No. 2,473,919, issued June 21, 1949, to M. L. Stone. Such projection lamps are fabricated in different wattage ratings, such as 300 w., 500 w., 750 w. and 1000 w., and with a varying lamp life of 10 to 25 hours (each wattage rating and life rating requiring a different filament). In addition, in each wattage class and in each life rating class other variables, such as burning position (i.e., base-down, horizontal or base-up), light-center length and bulb size make each projection lamp type dimensionally different from the other types. The result is that a large number of individual jigs are required to manufacture the many different sizes and shapes of projection-lamp filament mounts. Further, because of the relatively low volume of each particular type, it is impossible to economically justify the use of the individual automatic equipment for the individual manufacture of each mount type. However, rising labor costs and increased competition for a fixed selling price dictates that the manufacturing cost of such projection lamps be decreased through the use of automatic apparatus, which automatic apparatus can only be justified economically if one automatic apparatus can be used to fabricate filament mounts for all types of projection lamps.

It is the general object of the present invention to avoid and overcome the foregoing and other difficulties of and objections to prior art practices by the provision of a module assembly or universal mount sub-assembly for all types of projection lamps.

Another object of the present invention is the provision of a method for modular mounting such module assembly in all types of projection lamps, which method is adapted for use with a single automatic apparatus.

A further object of the present invention is the provision of a module assembly which is rigid in structure, thereby being adapted to lie in one plane so that such module assembly may be stored for future use.

Yet another object of the present invention is the provision of a method of making the module assembly of the present invention.

The aforesaid objects of the present invention and other objects which will become apparent as the description proceeds are achieved by providing a module assembly comprising an integral outer frame member, a top and bottom bridge carried by said frame member, and a filament mounted on said top and bottom bridge and the frame member.

The method for making this module assembly comprises the steps of forming a U-shaped frame member and mounting a filament on said frame member to provide a module assembly leaving a predetermined module light-center length.

The method for mounting such module assembly on the projection lamp stem comprises the steps of affixing the frame member of the module assembly in the desired predetermined position on the lead wires of a projection lamp stem and then removing a portion of the frame member between the lead wires.

For a better understanding of the present invention reference should be had to the accompanying drawings, wherein like numerals of reference indicate similar parts throughout the several views, and wherein:

FIG. 1 is a perspective view of the module assembly of the present invention.

FIG. 2 is a front-elevational view of a frame member of the module assembly shown in FIG. 1.

FIG. 3 is a side-elevational view of the frame member taken from the right side of FIG. 2.

FIG. 4 is a perspective view of a filament for the module assembly shown in FIG. 1.

FIG. 5 is a perspective view of a fixed bridge employed in the module assembly of FIG. 1.

FIG. 6 is a perspective view of a floating bridge for the module assembly of FIG. 1.

FIG. 7 is a plan-elevational view of a fixture or jig for assembling the module assembly of the present invention.

FIG. 8 is a longitudinal-sectional view along the line VIII—VIII of FIG. 7 in the direction of the arrows.

FIG. 9 is a side-elevational view of one type of 500 w. projection lamp for base-down operation and in which the module assembly of the present invention is incorporated.

FIG. 10 is a view similar to FIG. 9 showing a second type of 500 w. projection lamp provided with the module assembly of the present invention and having a lamp light-center length which is different from that shown in the projection lamp shown in FIG. 9.

FIG. 11 is a view similar to FIGS. 9 and 10 but of a third type of 500 w. projection lamp for base-up operation.

FIG. 12 is a view similar to FIGS. 9 through 11 of a 750 w. or 1000 w. projection lamp employed for base-down operation.

FIG. 13 is a front-elevational view of a light-reflecting shield employed with the projection lamp shown in FIG. 12.

FIG. 14 is a side-elevational view of a fourth type of 500 w. projection lamp incorporating the module assembly of the present invention and operable in the horizontal burning position.

FIG. 15 is a perspective view of a heat-radiator shield utilized in the projection lamp shown in FIG. 14.

FIG. 21 is a view similar to FIG. 16 but of a head employed for the mounting of the module assembly of the present invention on the stem of a projection lamp of the type shown in FIG. 10.

FIG. 22 is a view similar to FIG. 21 of a head for mounting a module assembly of the present invention on a stem of a projection lamp of the type shown in FIG. 11.

FIG. 23 is a horizontal-sectional view along the line XXIII—XXIII of FIG. 22 in the direction of the arrows.

FIG. 24 is a diagrammatic plan view of an automatic mounting machine for mounting the module assembly on the stem of an incandescent projection lamp.

Figure 16:
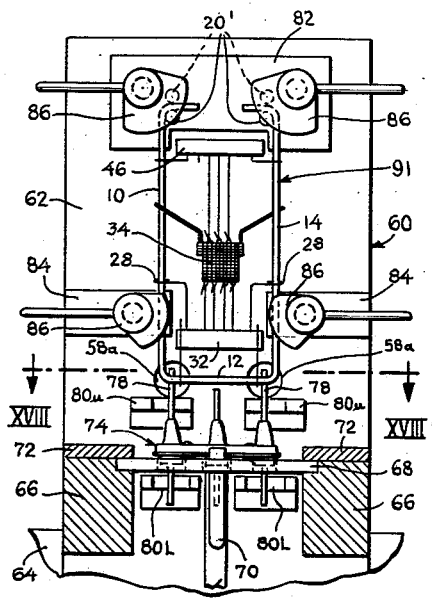
FIG. 16 is a vertical-sectional view of a head of an automatic mounting machine employed for mounting, by welding, the module assembly of the present invention on the stem of a projection lamp of the type shown in FIG. 9, and taken along the line XVI—XVI of FIG. 17 in the direction of the arrows.

Although the principles of the present invention are broadly applicable to a module assembly for incandescent lamps in general, the present invention is particularly adapted for use in conjunction with a module assembly for projection lamps and hence it has been so illustrated and will be so described.

With specific reference to the form of the present invention illustrated in the drawings, and referring particularly to FIGS. 1-3, a frame member of the module assembly of the present invention is indicated generally by the reference numeral 10. The frame member 10 is formed into the generally U-shaped configuration, shown in FIG. 2, from a suitable single length of wire either by hand or by a suitable bending jig (not shown). As noted from a consideration of FIGS. 2 and 3, such frame member 10 has the dimensions "a," "b" and "c" and its base or bottom portion 12 is longitudinally off-set from its side portions 14 to permit mounting of the frame member 10 (and hence the module assembly of the present invention) on lead wires with said frame member 10 disposed on the longitudinal axis of a lamp stem, as hereinafter explained in detail.

The method for assembling the module assembly, which may be accomplished by hand or with the aid of the fixture shown in FIGS. 7 and 8 will now be described with respect to such fixture.

*Module assembly and method of manufacture*

In order to fabricate the module assembly of the present invention, shown in FIG. 1, the frame member 10 is first positioned in the fixture for assembling such module assembly (FIGS. 7 and 8) with its longitudinal axis coinciding with the longitudinal axis of the assembly fixture. To accomplish this, the bottom portion of the frame member 10 rests on supporting blocks 16 and is disposed around pins 18 upstanding from the supporting blocks 16, with upper portions 15 of such frame member 10 positioned by similar pins 20 upstanding from supporting blocks 22 upon which such upper portions 15 rest. Pivoted locking bars 24 are then swung into the position shown in FIG. 7 on top of the now-positioned upper portions 15 and bottom portion 12 of the frame member 10 and such locking bars 24 are secured in this position by the pivotable movement of adjustable locking studs 26 into suitable slots provided in the free ends of such locking bars 24. Half-loops 28 (FIG. 6) in the ends of upper tie wires 30 of a floating bridge 32 are then slipped over the side portion 14 of the frame member 10 and similar half-loops 29 in bottom tie wires 31 are simultaneously moved into position about the lower portion 12 of such frame member 10 to the position shown in FIGS. 7 and 8 where such floating bridge 32 is supported by the frame member 10. Bottom loops 33 between adjacent sections of a projection lamp filament 34 of the desired wattage rating are placed in hooks 35 on support wires 36 of this floating bridge 32 and the sections of such filament 34 are nested in longitudinal positioning grooves provided in the upper surface (FIGS. 7 and 8) of an adjustably-mounted lower nesting block 38, thus locating the longitudinal axis of the filament 34 on the longitudinal axis of the frame member 10 and the assembly fixture, with legs 39 of the filament 34 disposed across side portions 14 of the frame member 10. The means utilized to locate such filament 34 on the longitudinal axis of the assembly fixture (so that the proper module light-center length "$d_1$," FIG. 1, is obtained, with the lower half-loops 29 seated on bottom portion 12, and the lower loops 33 likewise seated in the hooks 35) comprises locating blocks 40, adjustably mounted at opposite ends of the lower nesting block 38. Thereafter, an upper nesting block 42 is placed in position on top of the now positioned filament 34 between the locating blocks 40. To complete the positioning of the elements of the module assembly in the assembly fixture, hooks 43 on support wires 44 (FIG. 5) of a fixed bridge 46 are first threaded through top loops 47 of the filament 34 and such support wires 44 are then positioned in longitudinal positioning grooves provided in a fixed-bridge supporting block 48, with tie wires 50 of the fixed bridge 46 resting on the side portions 14 of the frame member 10. To approximately seat the top loops 47 of the filament 34 in their associated hooks 43, a cane 52 of such fixed bridge 46 is disposed contiguous to an inclined surface 54 on the fixed-bridge supporting block 48 preparatory for the welding operation. Thereafter, upper welding electrodes 56u and lower welding electrodes 56L are moved from the spaced solid-line position, shown in FIG. 8, toward the tie wires 50 and the legs 39 (FIG. 7, which are positioned on the side portions 14 of the frame member 10) to engage and weld these above-mentioned elements together. During this welding-electrode movement the top loops 47 are manually seated in the hooks 43 and, as can be noted from FIG. 7, the lower electrodes 56L pass through suitable clearance holes 58 in the assembly fixture.

The now-completed module assembly of the present invention (shown in FIG. 1) is then removed from the assembly fixture shown in FIGS. 7 and 8, and either stored for future use or transferred to a head 60 (FIGS. 16-20) or 60' (FIGS. 21-23) of an automatic mounting machine of the type shown in FIG. 24 for incorporation into a lamp mount.

*Lamp mount and method of manufacture*

Referring now particularly to FIGS. 16-20, the head 60 is adapted to assemble a lamp mount for a projection lamp of the type shown in FIG. 9 and disclosed in U.S. patent application Serial No. 714,730, filed February 12, 1958, by J. F. Michael et al. and assigned to the same assignee as the present invention.

The eight heads 60, shown in FIG. 24, are carried by a turret 64 and are indexable by conventional means (not shown) through a like number of work stations. Each head 60 (FIGS. 16-20) has a vertical mounting plate 62 provided with slide blocks 66 projecting therefrom to permit the mounting thereon of a stem-supporting slide 68 which is heorizontally reciprocable on the slide blocks 66 by means of a handle 70. Retaining plates 72 on the slide blocks 66 retain the stem-supporting slide 68 in the slide blocks 66.

Figure 17:
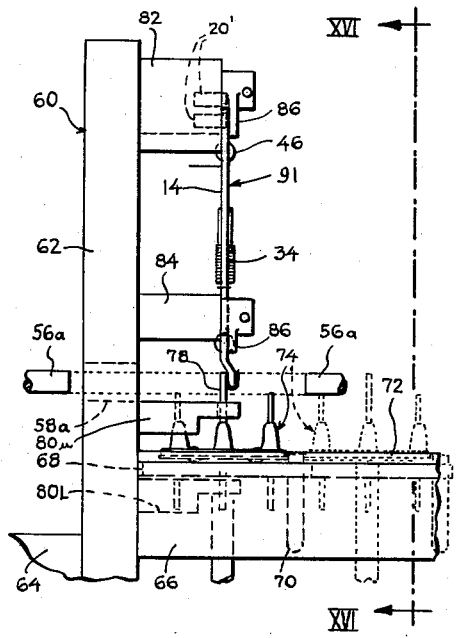
FIG. 17 is a side-elevational view of a head shown in FIG. 16.

After a head 60 indexes into Station "1," the stem-loading station, the operator moves the stem-supporting slide 68 outwardly, by means of the handle 70, as viewed in FIG. 17, from the solid-line position to the dotted-line position shown in such figure and inserts the tubulation and lead wires of a stem 74 into suitable locating holes 76 provided in the stem-supporting slide 68 to locate the stem 74 with the lead wires disposed in a predetermined horizontal pattern, preparatory for mounting thereon a module assembly. As the now-loaded stem-supporting slide 68 is retracted to the solid-line position shown in FIG. 17, long lead wires 78 engage and are vertically aligned by V-shaped upper alignment blocks 80u and lower alignment blocks 80L preparatory for the above-mentioned mounting operation. Both the upper alignment blocks 80u and the lower alignment blocks 80L are mounted on the mounting plate 62. Likewise an upper supporting block 82 and a pair of lower supporting blocks 84 projects outwardly from the mounting plate 62.

At Station "2," the module assembly loading station, a module assembly is positioned on the upper supporting block 82 (FIGS. 16-17) and the pair of lower supporting blocks 84 by pins 20' outstanding from the upper-supporting blocks 82. Pivoted cam clamps 86 carried by the blocks 82 and 84 are then rotated into engagement with the frame member 10 to secure the module assembly in the head 60 in vertical alignment with the long lead wires 78 and with the bottom portion 12 of the frame member 10 properly positioned with respect to said long lead wires 78 to provide the desired lamp light-center length "$d_2$," FIG. 9.

Figure 18:
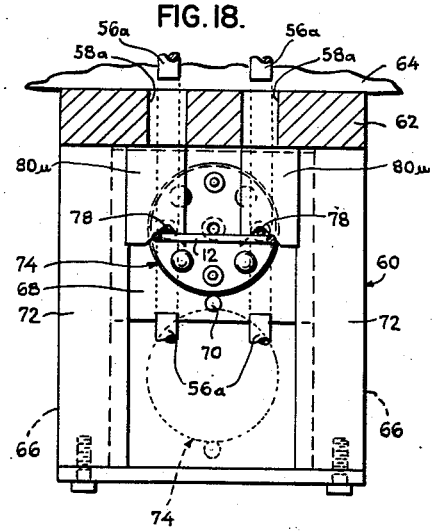
FIG. 18 is a horizontal-sectional view along the line XVIII—XVIII of FIG. 16 in the direction of the arrows.
Figure 19:
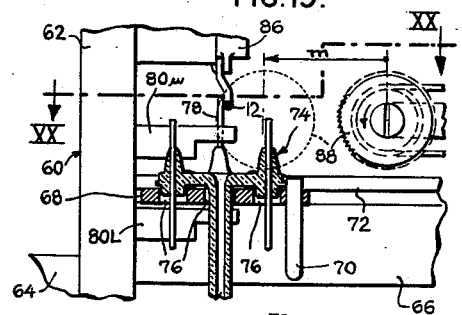
FIG. 19 is a vertical-sectional view along the line XIX—XIX of FIG. 20 in the direction of the arrows and showing the means for removing a section of the frame member between the welds.
Figure 20:
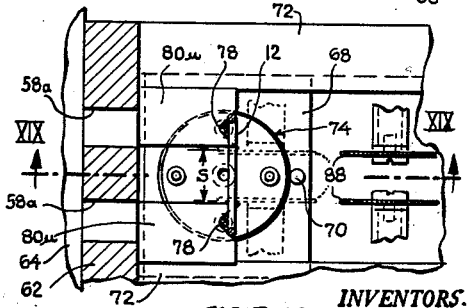
FIG. 20 is a horizontal-sectional view along the line XX—XX of FIG. 19 in the direction of the arrows.

When the now-fully loaded head 60 arrives at Station "4," the welding electrodes 56a are moved from the solid-line position shown in FIGS. 17 and 18 into engagement with the now-positioned long lead wires 78 and the bottom portion 12 of the frame member 10 to spot weld them together. During this movement the left-hand welding electrodes 56a (FIG. 17) pass through clearance holes 58a in the mounting plate 62.

It will be understood that the long lead wires 78 may also be secured to the bottom portion 12 by soldering or mechanically by forming half-loops in the ends of the long lead wires 78 and clamping these loops about the bottom portion 12 and that alternatively, the long lead wires 78 may be secured to the side portions 14 or only one of such long lead wires 78 secured to a side portion 14 and the other to the bottom portion 12.

At Station "6," the severing station (FIG. 24), a section S (FIG. 20) of the bottom portion 12 of the frame member 10 adjacent the welds is removed by a pair of serrated cutting wheels 88 (FIGS. 19 and 20) by lateral movement of such cutting wheels 88 from the solid-line position in such figures to the dotted-line position. During such movement the cutting wheels 88 engage and sever this predetermined section S to render the now completed lamp mount 91 operative by elimination of the electrical short across the long lead wires 78. This removed section S has sufficient length to prevent arcing across the long lead wires 78 during operation of the projection lamp 90 shown in FIG. 9. Alternatively, one cutting wheel 88 may be employed to sever the bottom portion 12 of the frame member 10 between the welds and the severed portions then bent apart to accomplish the same result. Thereafter, the finished lamp mount 91 is unloaded from the head 60 at Station "7," the discharge station, as indicated in FIG. 24.

The lamp mount 91 is then sealed to an envelope 92 (FIG. 9) by a sealing machine; exhausted on an exhaust machine and providing with a base 94 on a finishing machine all in the conventional manner as well known in the art.

*Alternative embodiment of head*

In the manufacture of lamp mounts 91a and 91b for the 500 w. (base-down) projection lamp 90a and the 500 w. (base-up) projection lamp 90b, shown respectively in FIGS. 10 and 11, the stem-supporting means and the stem-aligning means employed on the head 60' (FIGS. 21–23) are somewhat different from the corresponding means used on the head 60 (FIGS. 16–20). Since the steps 74a (FIG. 21) and 74b (FIG. 22) are materially different from the stem 74 (FIG. 16) a stem supporting head 96 (FIG. 23) is adjustably mounted in a vertical slot 98 in the mounting plate 62 and is secured at a predetermined location therein a bolt 100 to provide the respective mount light-center lengths "$d_{2a}$" (FIGS. 10 and 21) and "$d_{2b}$" (FIGS. 11 and 22).

In order to vertically sign the lead wires of the stems 74a and 74b respectively, guide blocks 102 are adjustably mounted in a lateral guide slot 104 in the mounting plate 62. Additionally, the clearance holes 58a' in the mounting plate 62 for the welding electrodes (not shown in FIGS. 21–22) are elliptical in cross-section to allow for lateral adjustment of such welding electrodes.

*Other projection lamp types*

Referring now to FIG. 12 and the 750 w. or 1000 w. (base-down) projection lamp 90c shown therein, it will be appreciated that the module assembly of the present invention is modified by the addition of a light-reflecting shield 106 (FIG. 13), mounted on a support wire 44a of the fixed bridge 46 to locate such light-reflecting shield 106 behind the filament 34. The lamp mount 91c is then assembled on an automatic mounting machine having heads 60 (FIGS. 16–20) to provide a mount light-center length "$d_{2c}$" (FIG. 12).

In the manufacture of a 500 w. (horizontal-burning) projection lamp 90d (FIG. 14) the above-described modified module assembly is further modified by the addition of a heat radiation shield 108 (FIG. 15) to the upper side portion 14 of the frame member 10, as viewed in FIG. 14, to prevent softening of the envelope 92d during lamp operation. The lamp mount 91d is then assembled on an automatic mounting machine having heads 60 (FIGS. 16–20) to provide a mount light-center length "$d_{2d}$" (FIG. 14).

From the foregoing it will be obvious that the above-described methods of mounting the module assembly of the present invention on the various lamp stems 74, 74a, etc. may be accomplished by hand as well as by operation of the above-described automatic apparatus.

It will be further appreciated by those skilled in the art that the objects of the present invention have been achieved by the provision of a module assembly for all types of projection lamps. Such module assembly is of rigid structure thus maintaining it substantially in one plane and which readily adapts it to storage for future use. In addition, a method of making the module assembly and a method of modular mounting of such module assembly is provided, which method of mounting facilitates its use with a single automatic mounting machine.

While in accordance with the patent statutes a preferred embodiment of the present invention has been illustrated and described in detail, it is to be particularly understood that the invention is not limited thereto or thereby.

We claim:
1. A module assembly for a projection lamp filament mount having a predetermined light-center length, said module assembly comprising, a one-piece generally U-shaped frame member having two side portions connected by a base portion, a projection lamp filament comprising a plurality of adjacent sections, one end of said filament electrically connecting to one side portion of said frame member and the other end of said filament electrically connecting to the other side portion of said frame member, a fixed bridge member having an electrically insulating portion intermediate its ends and fixedly secured to and between the side portions of said frame member, a floating bridge member having an electrically insulating portion intermediate its ends and slidingly secured to and between the side portions of said frame member, and said filament supported by and between the electrically insulating portions of said fixed bridge member and said floating bridge member in a predetermined position with respect to said frame member to provide said predetermined light-center length.

2. The module assembly as specified in claim 1, wherein the base portion of said frame member is offset from the side portions of said frame member.

References Cited by the Examiner
UNITED STATES PATENTS

| | | | |
|---|---|---|---|
| 2,116,384 | 5/38 | Cartun | 313—271 |
| 2,192,753 | 3/40 | O'Neill | 29—25.14 |
| 2,214,974 | 9/40 | Scott | 29—25.14 |
| 2,315,504 | 4/43 | Curtis | 313—272 |
| 2,404,070 | 7/46 | Hirmann | 313—333 |
| 2,462,325 | 2/49 | Leighton | 313—333 |
| 2,605,440 | 7/52 | Gero | 313—113 X |
| 2,961,568 | 11/60 | Pertwee | 313—271 |
| 2,973,443 | 2/61 | Wiley | 313—113 X |

DAVID J. GALVIN, *Primary Examiner.*
RALPH G. NILSON, ARTHUR GAUSS, *Examiners.*